United States Patent
Shank et al.

(10) Patent No.: US 6,851,624 B1
(45) Date of Patent: Feb. 8, 2005

(54) VEHICLE FLUID HEATING SYSTEM

(75) Inventors: David Shank, Hersey, MI (US); John Washeleski, Cadillac, MI (US)

(73) Assignee: Nartron Corporation, Reed City, MI (US)

( * ) Notice: Subject to any disclaimer, the term of this patent is extended or adjusted under 35 U.S.C. 154(b) by 48 days.

(21) Appl. No.: 10/269,647

(22) Filed: Oct. 11, 2002

Related U.S. Application Data

(60) Provisional application No. 60/415,552, filed on Oct. 2, 2002.

(51) Int. Cl.$^7$ ................................................. B05B 1/10
(52) U.S. Cl. ............................... 239/284.1; 239/284.2; 239/128; 239/130; 239/135
(58) Field of Search ........................... 239/284.1, 284.2, 239/128, 130, 135

(56) References Cited

U.S. PATENT DOCUMENTS

| | | | |
|---|---|---|---|
| 4,090,668 A | * | 5/1978 | Kochenour ................. 239/130 |
| 4,233,494 A | * | 11/1980 | Pawlik et al. ............... 392/488 |
| 5,012,977 A | * | 5/1991 | Karklins et al. .......... 239/284.1 |
| 5,354,965 A | * | 10/1994 | Lee ........................... 239/284.1 |
| 5,509,606 A | * | 4/1996 | Breithaupt et al. ....... 239/284.1 |
| 5,927,608 A | * | 7/1999 | Scorsiroli ................. 239/284.1 |
| 5,957,384 A | | 9/1999 | Lansinger |
| 6,029,908 A | * | 2/2000 | Petzold ..................... 239/284.1 |
| 6,032,324 A | | 3/2000 | Lansinger |
| 6,133,546 A | * | 10/2000 | Bains ......................... 239/130 |
| 6,364,010 B1 | | 4/2002 | Richman et al. |
| 6,465,765 B2 | * | 10/2002 | Katayama et al. .......... 219/630 |
| 6,601,776 B1 | * | 8/2003 | Oljaca et al. .................. 239/5 |
| 6,669,109 B2 | * | 12/2003 | Ivanov et al. ............ 239/284.1 |

OTHER PUBLICATIONS

Jacobs Electronics Safe–Vue Heater Brochure, pagse 1–4, at least as early as Jun. 28, 2002.
1 Page Valeo OPTI–Wash spec sheet, date unknown.
3 Page website, www.aaro.ca/BreakingNews/Sep26–Oct17–01NwsBfs.html, posted Oct. 1, 2001.
4 Page installation and owner's manual, Safe–Vue Heater, Kit #250–6652, Rostra Precision Controls, Inc., date unknown.
Bennett,"Hot water clears icy windshields," 2 pages, Free Press, date unknown.
2 Page website, www.theautochannel.com/news/2001/09/20/–29185/html., "Valeo Maximizes Driver Visibility With OPTI–Wash Heated Wash System", date unknown.
1 Page webiste , www.ai–onlinee.com/issues/article_detail.asp?id=22,, Dec. 2002.
Buchholz, "See and be seen with Valeo Technologies," AEI, Mar. 2003.

* cited by examiner

*Primary Examiner*—Robin O. Evans
(74) *Attorney, Agent, or Firm*—Watts Hoffman Co., LPA

(57) ABSTRACT

A deicing system for use with a vehicle. Apparatus of the system has an inlet port for receiving a fluid; an outlet port for dispensing a heated fluid; an electrically conductive tube connecting the inlet port and the outlet port for heating fluid passing through the tube from the inlet to the outlet; and a control circuit for energizing opposite ends of the coiled tube with a voltage to heat the tube and the fluid passing through the tube.

25 Claims, 4 Drawing Sheets

VEHICLE FLUID HEATING SYSTEM

RELATE BACK

This application claims priority under 35 U.S.C. 119(e) of U.S. provisional application Ser. No. 60/415,552 filed on Oct. 2, 2002.

FIELD OF THE INVENTION

The present invention concerns a de-icing system for a vehicle that can either manually or automatically de-ice a surface.

BACKGROUND ART

U.S. Pat. No. 6,364,010 entitled "Device to Provide Heated Washer Fluid" to Richman et al. concerns an apparatus and method for improving the cleaning and deicing effectiveness of a washer fluid in a motor vehicle before spraying it against a windshield, headlamps, etc, and utilizes the heat from the engine coolant to elevate the temperature of the washer fluid. U.S. Pat. Nos. 5,957,384 and 6,032,324 also concern de-icing of a windshield.

SUMMARY OF THE INVENTION

The invention concerns apparatus and method for providing a heated de-icing fluid to a vehicle surface. A system constructed with an exemplary embodiment of the invention has an inlet port for receiving an amount of fluid; an outlet port for dispensing an amount of heated fluid; a heating element that heats up fluid passing from the inlet to the outlet; and a control circuit for energizing at least a portion of the heating element with a voltage to heat the fluid passing from the inlet to the outlet.

One embodiment is coupled to a motor vehicle windshield washer system. The inlet port receives windshield washer fluid from the washer system and the outlet port delivers heated windshield washer fluid to nozzles that spray heated fluid onto a windshield. In an exemplary embodiment the delivery of high temperature fluid to the windshield can be accomplished in well under a minute after power is coupled to the heating element so that the windshield is quickly cleared of ice.

These and other objects advantages and features of the invention will become better understood from the following detailed description of one exemplary embodiment of the present invention which is described in conjunction with the accompanying drawings.

EXEMPLARY EMBODIMENT FOR PRACTICING THE INVENTION

Figure 1:
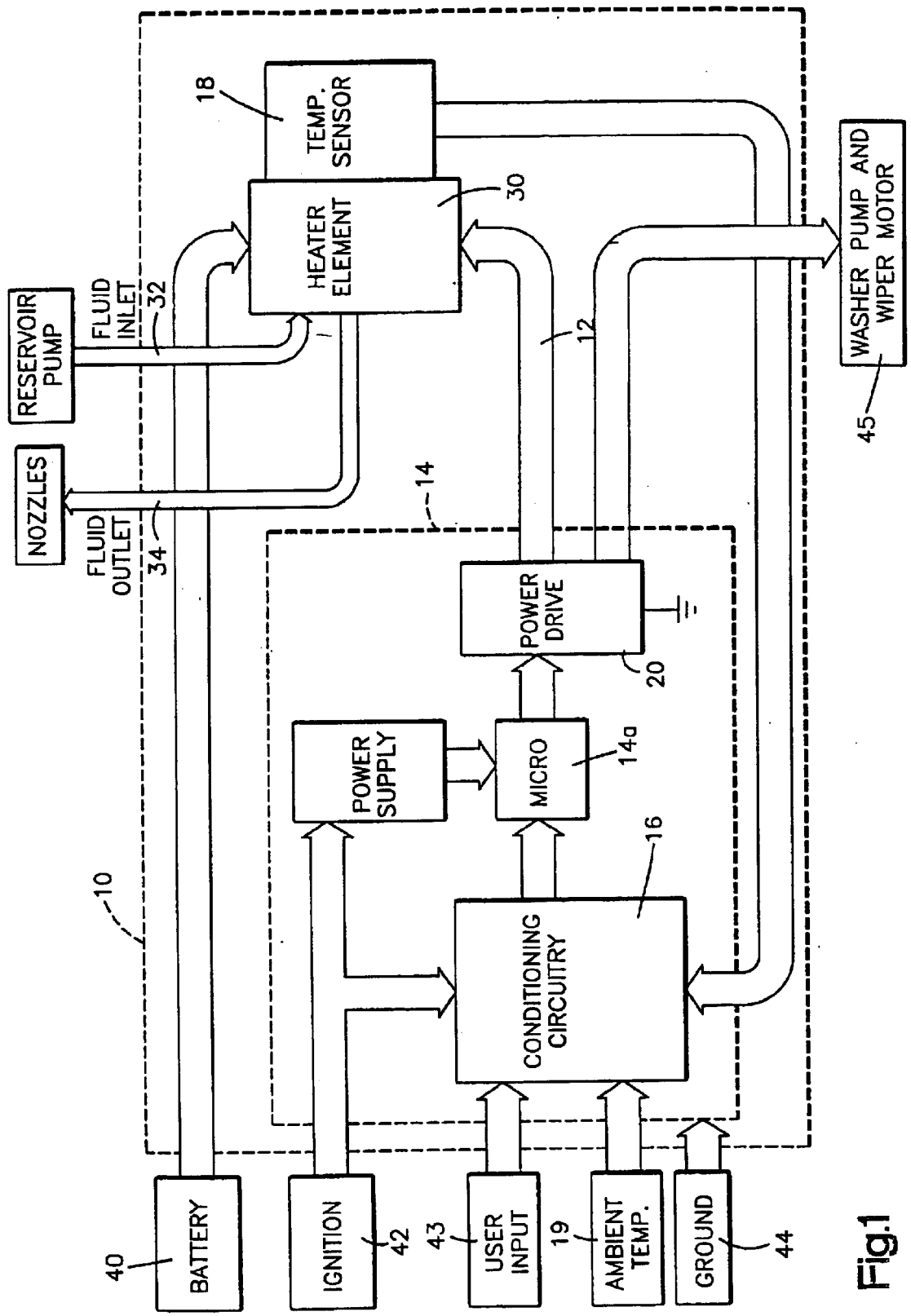
FIG. 1 is a block diagram schematic of a representative system for use with the present invention.

The drawings depict one embodiment of the present invention that concerns a washer control system 10 for use with a vehicle. In the disclosed exemplary embodiment of the invention the control system 10 is used in conjunction with a windshield washer apparatus. The control system 10 includes a control circuit 14 that includes an electronic output drive signal circuit 20 and an input signal interpretation circuit 16.

The input signal interpretation circuit 16 electronically interfaces with at least one temperature sensor 18. In one embodiment of the invention, the temperature sensor provides output signals related to the temperature of the washer fluid supplied to windshield spray nozzles on the vehicle. In one embodiment of the invention, the control system also includes an electronic output circuit that drives output power control for at least one heating element 30 that applies heat to the windshield washer fluid. The module output is a "low side" type drive, meaning the module activates and deactivates the heater element by controlling the electrical circuit path to ground. In accordance with an alternate control system, an electronic output coupled to a vehicular communication bus makes available data for system diagnostics.

The exemplary control circuit 14 includes a programmable controller 14a that implements control algorithms for washer heater control output functions in response to vehicle input signals.

As seen in the functional schematic of FIG. 1, the control system 10 includes an electronic output 12 from the control circuit 14 for providing controlled current to the heating element 30. The control circuit 14 also includes an input signal interpretation circuit 16, or interface, to monitor input signals from, as one example, the temperature sensor 18. The temperature sensor 18 provides signals that allows for control of the amount of power delivered to the heating element 30. An exemplary control system also includes electronic input and/or output circuitry to interface with at least one temperature sensor 19 for monitoring ambient temperature used in determining how much power to supply to the heating element. The controller monitors inputs from a vehicle battery 40, vehicle ground 44, and a vehicle ignition 42. In accordance with an alternate embodiment the controller also monitors ambient temperature by means of the temperature sensor 19. Furthermore, the controller provides output signals for controlling the heater element 30.

Figure 2:
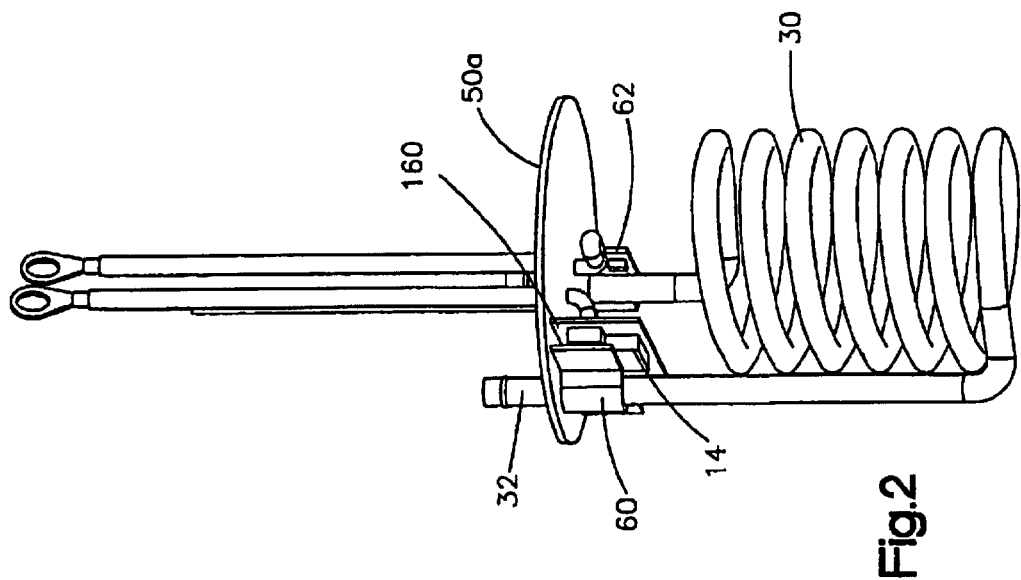
FIG. 2 is a perspective view of an embodiment of the invention showing a heating assembly without an outside housing.

The exemplary control system also includes an electronic output circuit 20 to control power coupled to at least one heater element 30 that heats windshield washer fluid as the fluid passes through the heating element 30. The heating element 30 is preferably a length of stainless steel tubing with electrical connections 60, 62 electrically coupled to ends of the tubing. As seen in the Figures the tubing has an inlet 32 and an outlet 34. The inlet receives washer fluid from a fluid reservoir of a motor vehicle and the outlet 34 delivers heated washer fluid to nozzles mounted to the vehicle which direct the washer fluid against the vehicle surface, typically a windshield, lamp etc. The heating element 30 can be constructed from other metals such as brass and the like having electrical resistivity properties such that they sufficiently resist current flow to generate the required heat. In FIG. 2 the stainless steel tube is shown coiled to reduce the overall length of the tube and the size of the heating system. Alternative embodiments could have the heater element in other bent or un-bent shapes such as serpentine or straight tube configurations. The heating element of FIG. 2 has an uncoiled length of approximately 4 to 5 feet and is constructed of $5/16$ inch diameter stainless steel tubing. When coiled to the configuration shown in FIG. 2 the coiled heating element has an inside diameter of 1 and $11/16$ inch.

Figure 5:
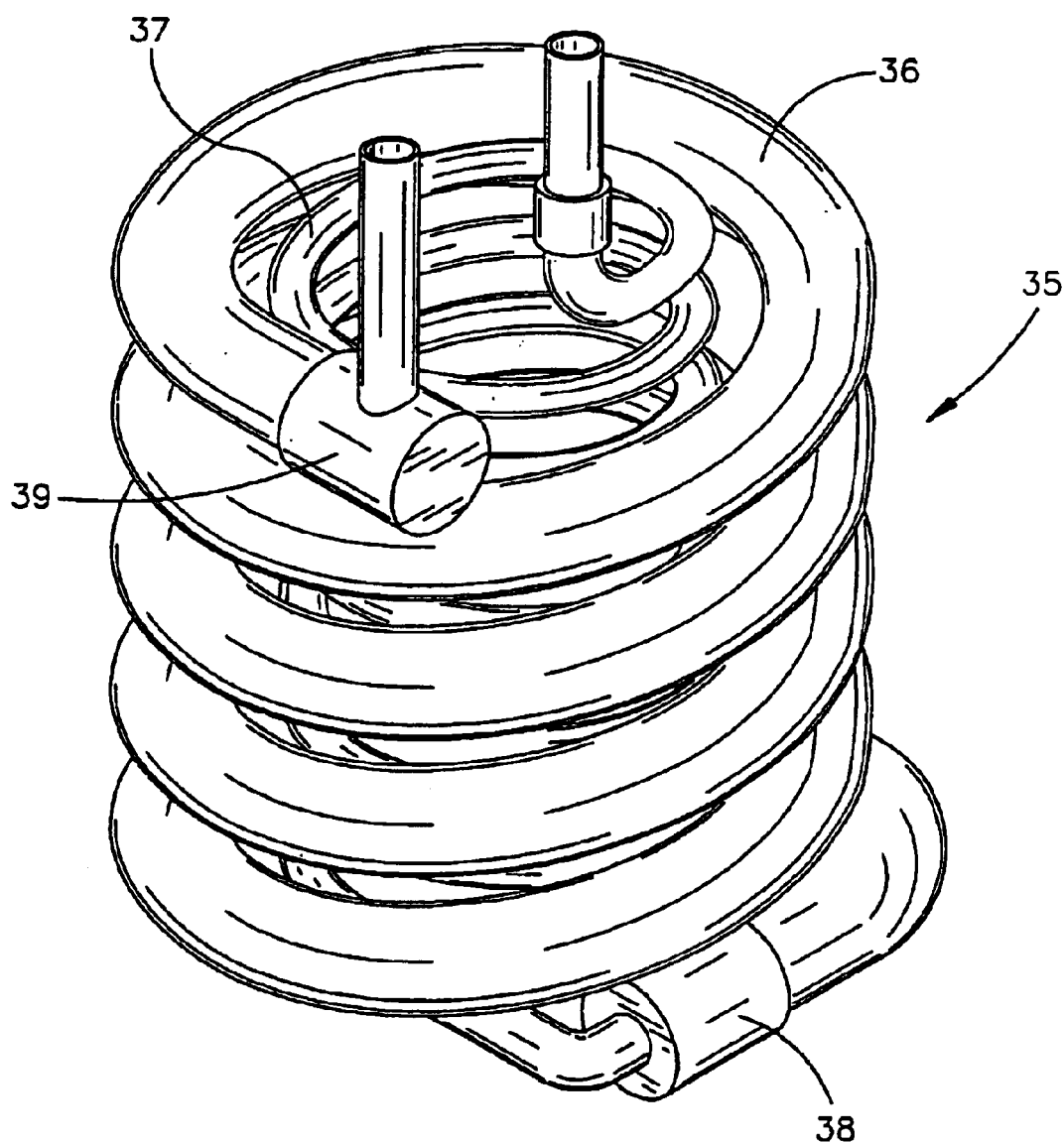
FIG. 5 is a perspective view of an alternative heating element from the heating element depicted in FIG. 2.

FIG. 5 depicts an alternative embodiment of a heating element 35 made up of two serially connected coiled tubes 36,37. A fluid tight engagement between the two tubes 36, 37 is accomplished by a coupling 38 having openings sized to accommodate the two tubes 36, 37. This alternate heating element 35 has an inlet for routing de-icing fluid into the larger tube 36 by means of an electrically conductive coupling 39. The first, larger diameter tube 36 is constructed from copper and has an outer diameter of approximately 5/8 inches. It is coiled to an inside diameter of 2 and 3/8 inches. The second smaller diameter tube 37 is connected to an outlet that routes heated de-icing fluid to nozzles or the like. The second diameter tube 37 is constructed of stainless steel having the same 5/16 inch diameter as the heating element of FIG. 2. This inner tube 37 is coiled to an inside diameter of 1 and 11/16 inches.

An energizing signal is applied to the ends of the series connected coils so that current passes through both tubes 36, 37. The stainless steel coil 37 has a higher resistivity and therefore heats to a higher temperature more quickly. The outer larger diameter copper coil is heated by some resistance heating but also by conduction, convection and radiation heating from the first inner coil 37. Both coils in this embodiment are surrounded by insulation within a housing.

Figure 3:
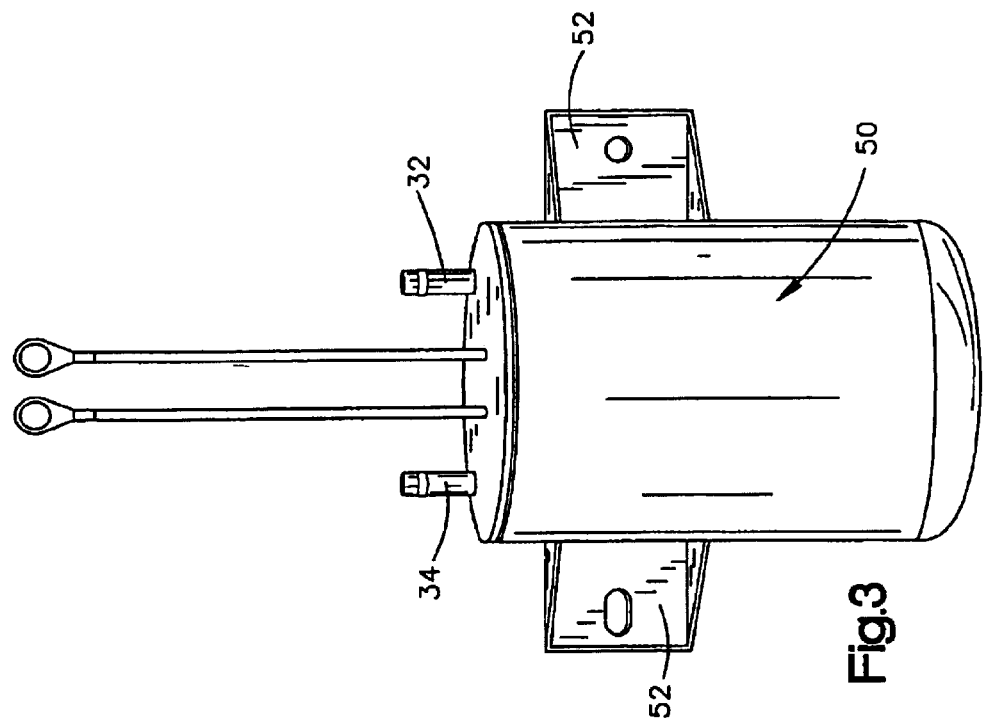
FIG. 3 is a perspective view of the FIG. 2 embodiment of the invention with a housing in place.

As shown in FIG. 3, both of the embodiments of the invention are packaged in a housing 50 that encloses the heaters 30, 35 and is located in the engine compartment of the vehicle. Flanges 52 extend from sides of the housing 50 to allow the housing to be attached to a wall of the vehicle engine compartment. FIG. 2 represents the disclosed invention shown in FIG. 3 without housing 50. Now referring to FIG. 2, the electrical connections 60 and 62 are shown on the ends of the given length of heating element 30. Similar connections are coupled to the ends of the series connected tubes of FIG. 5. As fluid passes through the heating element tube, the fluid is heated according to the amount of power applied to the tube, the fluid flow rate, and ambient temperature. The programmable controller 14 constructed in accordance with the exemplary embodiment of the invention also implements control algorithms for washer heater control output functions in response to vehicle input signals. As washer fluid temperature changes due to ambient temperature changes, battery voltage changes, and such, the amount of applied heat is increased or decreased in order to maintain a washer fluid at or near a target temperature.

Controller Schematics

Figure 4:
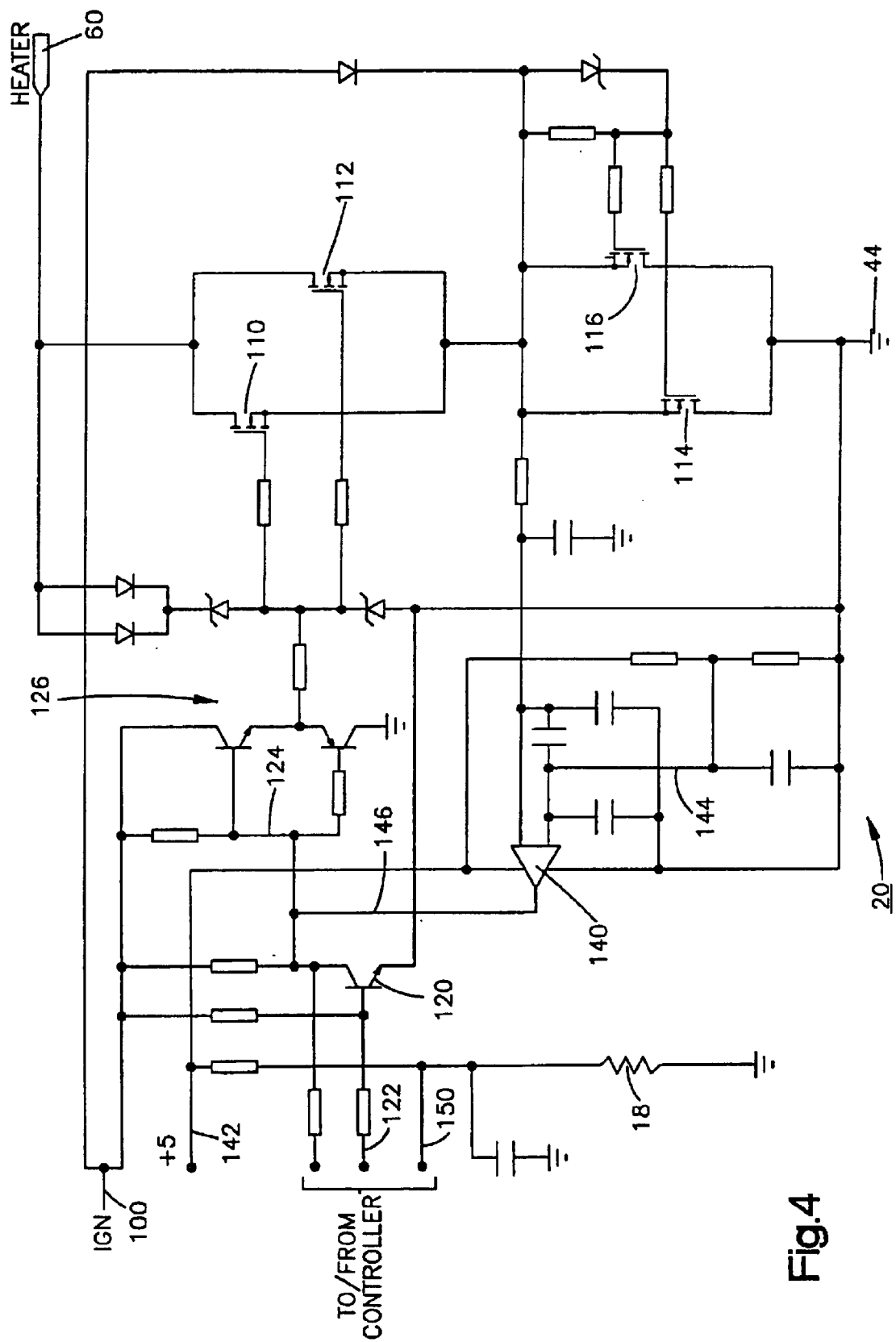
FIG. 4 is a schematic diagram of a drive circuit coupled to a fluid heating element that forms part of the FIG. 2 heating assembly.

The system block diagram shown in FIG. 1 and the more detailed schematic of FIG. 4 depict operation of the control system 10. External connections include Battery, Ground, and Ignition. The Battery input connection provides the voltage supply needed by the control system 10. This connection allows the high current flow required by the heating element. The Ground connection provides the current return path to the battery negative terminal. This ground connection allows the high current flow required by the heating element plus the requirement of the control system 10. An Ignition input 100 provides power to the controller. The battery voltage is monitored by the controller 14 to determine if there is sufficient voltage present to allow the control system to operate.

An input 102 from the temperature sensor 18 in physical contact with the heating element 30 is directly related to washer fluid temperature. Washer fluid temperature is monitored by using a temperature sensor such as a thermistor, RTD, or the like. The washer fluid is monitored non-invasively by attaching the temperature sensor to the stainless steel tube of the heater. The temperature of the tube corresponds to the temperature of the fluid within the tube. Alternatively the fluid temperature could be monitored invasively by placing a temperature sensor directly into the fluid through a threaded fitting or other suitable attachment method.

Operation

The controller receives a wake-up command signal from the Ignition input 100. When the Ignition input is above a predetermined voltage, the controller 14 drives one end of the heater element 30 or the series connected tubes of the heater 35 low if the following are true:

1. Ignition voltage greater than a predetermined level.
2. Sensed Heater element temperature less than a predetermined level.

An output driver 20 depicted in greater detail in FIG. 4 grounds one end of the heater for a maximum of 8 seconds after starting the heating cycle. The output driver will then begin applying power to the tube at such a rate by means of a pulse width modulated output as to maintain the temperature of the heater tube. In the exemplary embodiment of the invention, the desired tube temperature is predetermined to be 150 degrees Fahrenheit. The output driver 20 will remain active as ignition is still above a predetermined voltage. When the ignition is turned off, the controller is deactivated.

Turning now to FIG. 4, the output circuit 20 is depicted in greater detail. A heater connection 60 is shown in the upper right hand portion of the FIG. 4 depiction. This connection is grounded by means of initiating conduction of two FET power transistors 110, 112 which provide a current path to ground from the heater connection 60 to the ground connection 44 through a pair of reverse polarity protection FET transistors 114, 116. The two transistors 110, 112 are turned on or rendered conductive by means of a pre-drive transistor 120 that is coupled to an output 122 from the microprocessor controller 14a. First consider a high output from the controller 14a at this output 122. This turns on this transistor 120 which pulls an input 124 to a totem pole transistor combination 126 low. This signal turns on a lower of the two transistors of the totem pole combination to send activation signal that turns off the two FETs 110, 112. Next consider a low output from the controller 14a at this output 122. This turns off the transistor 120 which pulls an input 124 to a totem pole transistor combination 126 high. This signal turns on an uppermost of the two transistors of the totem pole combination to send an activation signal that turns on the two FETs 110, 112.

A comparator 140 monitors current through the transistors 114, 116 (and by inference the transistors 110, 112) and deactivates the transistors in the event too high a current is sensed. A five volt signal that is supplied at an input 142 from a power supply (FIG. 1) provides a reference input 144 to the comparator 140. When the non-reference input exceeds the reference input due to a rise in the current through the transistors 110, 112 (and associated rise in the voltage across the transistors 114, 116) the output 146 of the comparator goes low and removes the input from the gate of the FETs 110, 112 that causes them to conduct. This low signal at the output 146 is also coupled to the controller so that the controller can respond to the over current condition.

In accordance with the exemplary embodiment of the invention a thermistor temperature sensor 18 is also coupled to the controller. A signal at a junction between the temperature sensor 18 and a resistor coupled to the five volt input 142 generates a direct current signal at an input 150 related to the temperature of the heater 30.

A preferred control circuit 14 is mounted to a printed circuit board 160 supported by a cover 50a of the housing. As seen in FIG. 2, the connector 60 is a bent metallic member that attached to the heating element 30 in the vicinity of the printed circuit board 160 and is in physical contact with the circuit components on the printed circuit board. The connector 60 thereby not only acts as a path to ground for current passing through the heating element 30 but acts as a heat sink that transmits heat away from the printed circuit board to the tube of the heating element 30 in the region of the inlet where the reservoir pump routes de-icing fluid into the tube. Once the connections to the heating element have been completed, the housing 50 is attached to the cover 50a and a phenolic foam core material is placed into the housing. The material acts as an insulator to impede heat loss from the outer surface of the heating element.

The exemplary control circuit includes a microcontroller running at an internal clock frequency of 4.0Megahertz. When the ignition input goes high, the control circuit will power up, come out of reset, and wait for a start delay time to allow the vehicle's electrical system to become stable. After this start delay the control circuit monitors the ignition voltage to determine if the ignition is above a minimum enable voltage. A temperature signal from the sensor 18 is also monitored to see if the temperature of the de-icing fluid is below a set point temperature. The output drive feedback signal is also monitored to ensure that the output is in the correct state. If all conditions are such that the output can be enabled, the output to the transistor 120 is turned off. This initiates fluid heating. Initially, the output drive is on 100% for a predetermined on time or until the feedback temperature reading is greater than a set point temperature. Subsequently the control will read the heating tube temperature and make a determination if power should be reapplied to the tube. If the sensed temperature is below the desired setpoint, the output will be re-enabled at a variable duty cycle so that the tube is heated to the setpoint goal temperature as quickly as possible without exceeding a maximum allowable overshoot temperature.

Normal operation consists of maintaining the fluid temperature at the desired setpoint temperature by varying the duty cycle at which voltage is applied across the tube. The output duty cycle changes based on how far the sensed temperature is from the set point temperature.

In the event of excessive current flow through the output, the output will automatically be disabled. In this event the signal at the output 146 from the comparator will go low. When this occurs the controller 14a disables the output to the transistor for a period of time equal to an output retry rate programmed into the controller 14a. If the fault condition is removed, normal operation is re-instituted.

In the event the operating voltage from the battery (and ignition) is too high or too low (14.5 and 11 volts respectively) the controller 14a disables the output for a timeout period. After the timeout period, the controller again enables the output to determine if voltages conditions are within normal parameters. If a specified number of attempts to re-institute control fail, the controller disables the outputs until another ignition off-on sequence takes place.

Alternative Embodiments

An additional features of the invention adapted for use with a motor vehicle can be realized as described below. These embodiments have the same electrical configuration and operate in the same manner as the preferred embodiment.

One alternative embodiment of the invention uses a communications interface to determine ambient temperature, battery voltage, and engine running information.

An alternate embodiment could include electronic input and/or output circuitry to interface with at least one ambient air temperature sensor that provides output signals related to a sensed state of ambient air temperature.

Another embodiment of the invention could use engine coolant to heat the washer fluid prior to flowing through the heating element. This will reduce the amount of power required to heat the fluid to predetermined temperature using the heating element Another embodiment of the invention could use the washer pump to regulate the temperature of the washer fluid. In this embodiment the system would control the washer pump as well as the heating element. When the controller receives a request for washer use, the output driver would activate, heating the fluid with the heating element. When the washer fluid was at temperature the washer pump would be enabled. After the volume of heated fluid was used the pump would be disabled, and the fluid would again start heating to a predetermined level. After the fluid achieves the desired temperature level the pump would again be activated.

Another embodiment could use a flow switch to determine when to heat the fluid. The control would activate the output driver when flow is detected so that the fluid is heated only when there is a demand.

An alternative embodiment could use two fluid temperature sensors, one at the heater element inlet and the other at the heater element outlet. When the heater is in operation and fluid is flowing, there should be a temperature differential across the heater element. That is, a fluid of a given temperature goes into the heater element, and warmed fluid exits the heater element. If the control used the washer motor voltage as an input to initiate a heating cycle, the two fluid temperature sensors could be used to determine that fluid flow exists. If there is a temperature differential, there would be flow. If there were a minimal or negligible temperature differential, a zero or low flow condition would be indicated. In the event of a low or zero flow condition, the heating element would be de-energized.

Another embodiment could have a diagnostic output that could be used for evaluating system performance and for diagnosing system faults. Operational parameters will be sent via serial communications using a proprietary bus. A computer can be connected to the module using an appropriate interface cable to allow for reading and interpreting data.

Another embodiment could include control of the windshield wiper motor and washer pump. A separate switch input 43 (FIG. 1) would activate a cycle to dispense the fluid.

Another embodiment could include control of the windshield wiper motor and washer pump. A switch input would activate an automatic cycle to dispense the fluid.

In another embodiment, the module would control delayed wiper functions and would also have a switch input for one-touch control of the wiper motor and washer pump for spraying of washer fluid in an automatic wash cycle with an automatic wash cycle consisting of a given number of washer pump cycles and given number of wiper motor excursions. It is understood that cycle counts and motor excursions could be substituted for given times. While the invention has been described with a degree of particularity, it is the intent that the invention include all modifications and alterations from the disclosed design falling within the spirit or scope of the appended claims.

What is claimed is:

1. Apparatus for providing a heated fluid to a vehicle surface comprising:
   a) an inlet port for receiving an amount of fluid;
   b) an outlet port for dispensing an amount of heated fluid;
   c) an electrically conductive tube including two tubes of dissimilar material coupled together through which fluid passes from the inlet port to the outlet port for heating fluid passing through said two tubes as it passes from the inlet port and the outlet port; and
   d) a control circuit for energizing at least a portion of the electrically conductive tube with a voltage to create an electric potential drop across said portion of the electrically conductive tube to cause current to flow in walls of said tube to heat the electrically conductive tube and the fluid passing through said electrically conductive tube from the inlet to the outlet.

2. The apparatus of claim 1 wherein the control circuit grounds an electrical connection to create an electric potential drop across ends of the electrically conductive tube to cause current to flow in walls of said tube.

3. The apparatus of claim 1 wherein the control circuit comprises an input from a user for selectively activating the heating of fluid passing through the coiled electrically conductive tube.

4. The apparatus of claim 1 additionally comprising a motor vehicle windshield washer system and the inlet port receives windshield washer fluid from the washer system and wherein the outlet port delivers heated windshield washer fluid to nozzles to spray said fluid onto a windshield.

5. The apparatus of claim 1 wherein the electrically conductive tube is constructed of stainless steel.

6. The apparatus of claim 1 wherein the electrically conductive tube is constructed of brass.

7. The apparatus of claim 1 additionally comprising a heat sink for dissipating heat from the control circuit that is in physical contact with the conductive tubing.

8. The apparatus of claim 7 wherein the electrically conductive tube is constructed of stainless steel.

9. The apparatus of claim 8 wherein the heat sink is in contact with the conductive tubing at a region near the inlet to the conductive tubing.

10. The apparatus of claim 7 wherein the heat sink is copper.

11. The apparatus of claim 7 wherein the heat sink is brass.

12. The apparatus of claim 7 additionally comprising a printed circuit board to which the control circuit is mounted and wherein the printed circuit board is mounted to the heat sink.

13. The apparatus of claim 1 wherein the control circuit comprising a switch that couples power to the heating element.

14. The apparatus of claim 13 wherein the switch comprises one or more FET transistors.

15. The apparatus of claim 13 wherein the switch comprises one or more bipolar transistors.

16. The apparatus of claim 13 wherein the switch comprises a relay.

17. The apparatus of claim 1 wherein one tube is constructed of stainless steel and a second is constructed of copper.

18. The apparatus of claim 1 wherein one tube is coiled with a smaller diameter coil to fit inside a second larger diameter coil of the second tube and convey heat to the second tube when electrically energized by said control circuit.

19. A method for providing a heated fluid to a vehicle surface comprising:
   a) coiling a conductive tube constructed of two different conductive metals wherein a first section of said tube is coiled to form a first coiled section and a second section is coiled less tightly to form a second coiled section and wherein the first coiled section fits within a center portion of the second coiled section;
   b) coupling one end of the conductive tube to a source of washing fluid;
   c) routing a washing fluid into an inlet port of the conductive tube such that the fluid flows from the inlet to an outlet of said conductive tube;
   d) energizing at least a portion of the conductive tube with a voltage that creates a voltage drop along said portion and heats the conductive tube and the fluid passing through the conductive tube; and
   e) emitting the fluid from the conductive tube from an outlet port in fluid communication with a nozzle for dispensing heated fluid against said vehicle surface.

20. The method of claim 19 wherein a temperature sensor is coupled to the tube and wherein the temperature of said fluid that flows through the tube is inferred from the temperature of the tube.

21. The method of claim 19 additionally comprising monitoring a temperature of the fluid and wherein the energizing of the conductive tube is done in a manner based on the sensed temperature.

22. The method of claim 19 wherein the step of energizing the conductive tube is performed by a power circuit which dissipates heat to a heat sink mounted in contact with an exterior surface of the conductive tube to add heat energy to the fluid flowing through the tube.

23. The method of claim 19 wherein the conductive tube is supported within a housing and wherein insulation is added to a housing interior between the conductive tube and interior walls of the housing.

24. The method of claim 19 wherein de-icing fluid is routed into the less tightly section before it is transferred to a more tightly coiled section of the first coiled section.

25. The method of claim 19 additionally comprising the step of monitoring user input and activating a windshield washer pump and windshield wiper motor based on a setting of the user input while the heating element is heating fluid passing through said tube from the washer pump.

* * * * *